(12) United States Patent
Yamamoto et al.

(10) Patent No.: US 8,964,777 B2
(45) Date of Patent: Feb. 24, 2015

(54) BASE STATION AND METHOD OF INTERFERENCE HANDLING

(71) Applicant: Hitachi, Ltd., Tokyo (JP)

(72) Inventors: Tomonori Yamamoto, Fujisawa (JP); Rintaro Katayama, Fujisawa (JP); Shigenori Hayase, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 135 days.

(21) Appl. No.: 13/680,559

(22) Filed: Nov. 19, 2012

(65) Prior Publication Data

US 2013/0136110 A1 May 30, 2013

(30) Foreign Application Priority Data

Nov. 30, 2011 (JP) ................................. 2011-261608

(51) Int. Cl.
*H04L 12/43* (2006.01)
*H04W 72/04* (2009.01)
(Continued)

(52) U.S. Cl.
CPC ........ *H04W 72/0446* (2013.01); *H04W 72/082* (2013.01); *H04L 1/0003* (2013.01); *H04L 1/0026* (2013.01); *H04L 1/20* (2013.01)
USPC ........................................................ 370/458

(58) Field of Classification Search
CPC . H04W 52/243; H04W 36/20; H04W 72/121; H04W 72/0446; H04J 14/08; H04L 12/403; H04L 12/4035
USPC ......... 370/280, 294, 227, 336, 228, 235, 252, 370/255, 310, 310.2, 329, 332, 345, 465, 370/442, 395.21, 395.4, 395.41, 395.43, 370/328, 431, 445, 447, 326, 314
See application file for complete search history.

(56) References Cited

U.S. PATENT DOCUMENTS 5,506,848 A * 4/1996 Drakopoulos et al. ........ 370/336
7,555,300 B2 * 6/2009 Scheinert et al. ............. 455/450
(Continued)

FOREIGN PATENT DOCUMENTS

WO WO 2009/039432 A1 3/2009

OTHER PUBLICATIONS $3^{rd}$ Generation Partnership Project; Technical Specification Group Radio Access Network; Evolved Universal Terrestrial Radio Access Network (E-UTRAN); X2 application protocol (X2AP) (Release 10); 3GPP TS 36.423 V10.2.0 (Jun. 2011); ; pp. 68-72.

*Primary Examiner* — Kwang B Yao
*Assistant Examiner* — Ricardo Castaneyra
(74) *Attorney, Agent, or Firm* — Foley & Lardner LLP

(57) ABSTRACT

In a radio communication system where a base station provides blank time slots to avoid inter-cell interference, a decrease in throughput by an excess or shortage of blank time slots is prevented. This invention relates to a radio system that avoids interference in cooperation between base stations by providing blank time slots by a (first) base station. Other (second) base stations detect the number of served terminals affected by interference from the first base station that sets blank time slots, calculate required blank time slots so that the number of required blank time slots will increase with an increase in the number of terminals located in cell edges, and send a notification of the required blank time slots to the first base station. The first base station determines whether system throughput is anticipated to improve, based on the above notifications, and adjusts the length of blank time slots.

11 Claims, 16 Drawing Sheets

(51) Int. Cl.
  *H04W 72/08* (2009.01)
  *H04L 1/00* (2006.01)
  *H04L 1/20* (2006.01)

(56) References Cited

U.S. PATENT DOCUMENTS

| | | | |
|---|---|---|---|
| 2005/0180377 A1* | 8/2005 | Muramoto et al. | 370/345 |
| 2006/0133314 A1* | 6/2006 | Lee et al. | 370/329 |
| 2009/0080386 A1 | 3/2009 | Yavuz et al. | |
| 2009/0290560 A1* | 11/2009 | Feng | 370/336 |
| 2010/0222062 A1* | 9/2010 | Chou et al. | 455/449 |
| 2010/0272018 A1 | 10/2010 | Furueda et al. | |
| 2011/0026421 A1* | 2/2011 | Luo et al. | 370/252 |
| 2011/0053589 A1* | 3/2011 | Kimura et al. | 455/424 |
| 2011/0201341 A1* | 8/2011 | Choudhury et al. | 455/450 |
| 2011/0211487 A1* | 9/2011 | Han et al. | 370/252 |
| 2011/0228712 A1* | 9/2011 | Anderson | 370/280 |
| 2012/0099467 A1* | 4/2012 | Yamazaki | 370/252 |

* cited by examiner

FIG. 9

EXAMPLE OF THE COST-FUNCTION CALCULATION

| SINR (dB) | # OF UEs | WEIGHT | COST-FUNCTION |
|---|---|---|---|
| -10 ... -5 | 3 | 1.0 | 3.0 |
| -5 ... 0 | 0 | 0.5 | 0 |
| 0 ... 5 | 1 | 0.2 | 0.2 |
| ... | ... | ... | |

FIG. 10

EXAMPLE OF THE REQUIRING TIME SLOT TABLE

| TOTAL COST FUNCTION | # OF REQUIRING BLANK TIME SLOT |
|---|---|
| 2.0 ~ 3.0 | 5 |
| 3.0 ~ 4.0 | 6 |
| 4.0 ~ 5.0 | 7 |

BASE STATION AND METHOD OF INTERFERENCE HANDLING

CLAIM OF PRIORITY

The present application claims priority from Japanese patent application JP 2011-261608 filed on Nov. 30, 2011, the content of which is hereby incorporated by reference into this application.

FIELD OF THE INVENTION

The present invention relates to a base station and an interference handling method and, in particular, to a base station and an interference handling method for implementing interference control cooperatively in a heterogeneous network comprised of a plurality of small base stations and a macro-cell base station.

BACKGROUND OF THE INVENTION

Recently, development of FDD (Frequency Division Duplex) cellular radio communication systems adopting an OFDMA scheme is carried out actively. As a cellular radio communication systems adopting the OFDMA scheme, LTE (Long Term Evolution) is adopted as a worldwide standard.

In a cellular radio communication system, terminals become able to perform communication by accessing a radio network comprised of base stations and a core network. As for a basic function such as phone call, when a terminal sends a service request to a base station, the service is applied by establishing a connection with a terminal attached to the same base station or another base station via the core network. Also in the case of data communication, similarly, when a terminal sends a request for data communication to a base station, exchange of necessary information is performed via the core network. That is, in a cellular radio communication system, a terminal can perform communication only in an area covered by a base station.

A service area covered by a base station is called a cell. Cells are classified into so-called macro cells, pico cells, femto cells, etc. according to cell size. Or, the cells may be called differently according to different support functions. Near the edge of a cell, where communication quality deteriorates, it becomes difficult to keep good communication between a terminal and a base station. A region called a cell edge is known to be produced by two causes: one is that power from the base station attenuates over a long distance and the other is that interference radio waves arrive from a neighboring cell. In an OFDMA cellular radio communication system, it is thought that interference from a neighboring cell becomes dominant. When an interference power level from a neighboring cell becomes comparable to a desired signal level from the home cell, deterioration of SINR (Signal to Interference and Noise power Ratio), which is one of indicators representing communication quality, occurs. A terminal located in the cell edge has a deteriorated SINR and cannot perform communication unless it uses more radio resources than normally required. That is, a cell edge terminal is not only unable to perform high-speed communication and it can also be said that such a terminal occupies radio resources which might otherwise be assigned to another terminal having a good SINR.

Typically, in designing areas by a network operation, cell edges are allocated to land forms where terminals are unlikely to be located. However, in the center of a city among others, in a case where a base station's capacity accommodating terminals is exceeded because of dense population, another base station may be deployed nearby for the purpose of load distribution. In such a case, it is hard to design cells to allocate cell edges to places where fewer terminals may be located. Therefore, it becomes important to improve communication quality in cell edges by optimizing a communication method.

For instance, it is known that adoption of FFR (Fractional Frequency Reuse) is effective. FFR is a technique that splits a frequency band in which radio signals can be transmitted with high power into parts assigned to adjacent cells and covers cell-edge users by using the frequency band parts. If the FFR is applied, assignments of radio resources and power are coordinated according to classification into cell-center terminals and cell-edge terminals. Unless the FFR is used, transmission with equal power takes place in a whole band (f0). Scheduling can be performed without discrimination between cell center (near the base station of the cell) and cell edge, but in the cell edge, large interference occurs between adjacent cells. Thus, in the FFR, by splitting the frequency band (f0) split into bands (f1, f2, and f3), coordinating power that can be output in each frequency band, and appropriately selecting one of combinations (f1, f2, and f3) for each cell, suppression of interference between adjacent cells is carried out.

SUMMARY OF THE INVENTION

A macro-cell base station adopting the OFDMA scheme suppresses occurrence of inter-cell interference using the FFR. However, in some cases, it may be difficult that base stations such as, e.g., femto-cell base stations and pico-cell base stations deployed for the purpose of load distribution apply the FFR.

For instance, a situation where a plurality of pico cells extend into a macro cell should be considered. When pico-cell base stations are deployed to serve terminals located at high density, if a plurality of pico-cell base stations exist in the macro cell, there is a problem of FFR pattern duplication. In such a region, it is hard to limit power on a frequency axis by applying the FFR.

Thus, a method for suppressing inter-cell interference by time division multiplexing in cooperation between adjacent cells is discussed in an international standardization organization such as 3GPP. A macro-cell base station stops transmission of a data signal for certain time intervals (slots) and a pico-cell base station existing in the macro cell transmits a data signal for those time intervals. That is, interference control is realized by a time multiplexed pattern in cooperation between a plurality of cells.

If time intervals during which the macro-cell base station stops communication become longer than required, radio resources available for data for a terminal connected to the macro-cell base station (MUE: Macro-cell User Equipment) are limited. On the other hand, if a terminal connected to a pico-cell base station (PUE: Pico-cell UE) is not located near the cell edge between the pico cell and the macro cell, interference from the macro-cell base station becomes no problem for the pico-cell base station. Thus, cooperative interference control taking information representing the location of a terminal into account needs to be performed. However, there is no means for signaling such information between base stations and the following possibility might exist; even if the macro-cell base station stops data communication at the cost of deterioration in throughput, this does not lead to improving the throughput of the pico-cell base station.

Likewise, between a CSG (Closed Subscriber Group) base station to which limited users can only connect and a macro-cell base station, it is needed to ensure communication quality of MUEs located near the CSG base station. Thus, 3GPP discusses how to stop data communication in such a situation. Also in this case, if an MUE does not lie in the cell edge between the CSG base station and the macro-cell base station, it is not necessary to stop communication. In this case, again, a mechanism for sharing information representing the location of a terminal between the base stations is needed.

In 3GPP TS 36.423 v10.2.0, an interface for signaling time slots for which no data signal is transmitted between base stations is defined. Before such an interface is created, discussions about, inter alia, coping with a situation in which a single base station administrates a plurality of cells have been made. For instance, in Japanese Unexamined Patent Application Publication No. 2010-258845, cooperative scheduling is performed between a plurality of cells that are controlled by a single base station.

On the other hand, Japanese Unexamined Patent Application Publication (Translation of PCT Application) No. 2010-541332 describes cooperative scheduling between base station (cells). This cooperative scheduling uses a method in which a base station having an interference controller measures uplink traffic for surrounding base stations, identifies used/unused time slots, and notifies a neighboring base station of the used/unused time slots. That is, a master base station directly acquires information for slave base stations (partners of cooperative scheduling).

In view of the above described respects, an object of the present invention is to provide a base station and an interference handling method for avoiding an inter-cell interference. Another object of the present invention is to provide a method for setting blank time slots, which achieves both purposes of avoiding interference and reducing throughput deterioration.

In the present invention, a base station that wants another base station to stop communication determines the locations of terminals attached to its home cell from information for power measured by the terminals, determines whether time slots for which communication should be stopped (blank time slots) are sufficient from collected measurement information and the number of terminals served by it. If there is an excess or a shortage of blank time slots, the base station notifies another base station that stops communication of information representing blank time slots that can be used effectively.

The base station that stops communication, upon having been notified of the above information, performs control of blank time slots for which it should stop communication. Typically, the base station that stops communication is notified of the above information from a plurality of base stations. The base station that stops communication collects information notified from the plurality of base stations and changes a pattern of blank time slots only if overall system efficiency (throughput) is anticipated to improve.

For notification of the above information, means for direct signaling between base stations as well as means for signaling via upper layer management devices are provided.

According to a first solution of the present invention, in a radio communication system including a first base station that assigns a portion of time division radio resources to blank time slots and a second base station communicating with terminals using radio resources including the blank time slots, a base station for use as the second base station is provided.

The Base Station Includes:

a receiver that receives information representing radio channel conditions or signal quality metrics reported from terminals;

a required blank time slots calculation unit that calculates required blank time slots so that the number of required blank time slots will increase with an increase in the number of terminals located near a cell edge adjoining the first base station, according to an indicator for evaluating an amount of interference experienced by the terminals based on the information representing radio channel conditions or signal quality metrics reported from the terminals; and a notification unit that sends a notification of calculated required blank time slots to the first base station that increases or decreases blank time slots according to required blank time slots notified from a plurality of base stations.

In one aspect of the above radio communication system, the first base station is a base station having a larger cell (e.g., a macro-cell base station) and the second base station is a base station having a smaller cell than the first base station's cell (e.g., a femto-cell base station or a pico-cell base station).

In another aspect of the above radio communication system, the second base station is a base station having a larger cell (e.g., a macro-cell base station) and the first base station is a base station having a smaller cell than the second base station's cell (e.g., a femto-cell base station or a pico-cell base station). In a further aspect, the first base station is, for example, a CSG base station to which limited users can only connect and the second base station is a base station other than the first base station, which is adjacent to the first base station.

According to a second solution of the present invention, in a radio communication system including a first base station that assigns a portion of time division radio resources to blank time slots and a plurality of second base stations communicating with terminals using radio resources including the blank time slots, a base station for use as the first base station is provided.

The base station includes:

a receiver that receives from a plurality of second base stations or a management device, respectively, required blank time slots per second base station calculated so that the number of required blank time slots will increase with an increase in the number of terminals located near a cell edge between the first base station and the second base station, according to an indicator for evaluating an amount of interference experienced by the terminals based on information representing radio channel conditions or signal quality metrics reported from the terminals for each second base station; and a change determination unit that determines whether to change blank time slots provided by the first base station, based on the respectively required blank time slots, and increases or decreases the blank time slots if having determined to change the blank time slots.

According to a third solution of the present invention, there is provided an interference handling method in a radio communication system including a first base station that assigns a portion of time division radio resources to blank time slots, a plurality of second base stations communicating with terminals using radio resources including the blank time slots, and a management device.

The interference handling method includes:

receiving by each second base station information representing radio channel conditions or signal quality metrics reported from terminals communicating with the base station;

calculating by each second base station or a management device required blank time slots per second base station so that the number of required blank time slots will increase with an increase in the number of terminals located near a cell edge between the first base station and the second base station, according to an indicator for evaluating an amount of interference experienced by the terminals based on the information representing radio channel conditions or signal quality metrics reported from the terminals for each second base station, and receiving the required blank time slots per second base station and determining by the first base station or a management device whether to change blank time slots provided by the first base station based on the respectively required blank time slots, and increasing or decreasing the blank time slots by the first base station if having determined to change the blank time slots.

The above interference handling method can be implemented in, for example, the following radio communication system:

a radio communication system including a first base station that assigns a portion of time division radio resources to blank time slots and a plurality of second base stations communicating with terminals using radio resources including the blank time slots.

Each Second Base Station Includes:

a receiver that receives information representing radio channel conditions or signal quality metrics reported from terminals communicating with the base station;

a required blank time slots calculation unit that calculates required blank time slots so that the number of required blank time slots will increase with an increase in the number of terminals located near a cell edge between the first base station and the second base station, according to an indicator for evaluating an amount of interference experienced by the terminals based on the information representing radio channel conditions or signal quality metrics; and a notification unit that sends a notification of the required blank time slots to the first base station.

The first base station receives required blank time slots from a plurality of second base stations, includes a change determination unit that determines whether to change blank time slots provided by the first base station, based on the respectively required blank time slots, and increases or decreases the blank time slots if having determined to change the blank time slots.

According to the present invention, it is possible to provide a base station and an interference handling method for avoiding inter-cell interference. According to the present invention, it is also possible to provide a method for setting blank time slots, which achieves both purposes of avoiding interference and reducing throughput deterioration.

According to the present invention, cooperative scheduling in a time domain to avoid interference is also possible.

BRIEF DESCRIPTION OF THE DRAWINGS

FIG. 9 is a diagram showing an example of a cost function calculation method;
FIG. 10 is a diagram showing an example of conversion from a cost function value to the number of required blank times slots.

DETAILED DESCRIPTION OF THE PREFERRED EMBODIMENTS

Figure 1A:
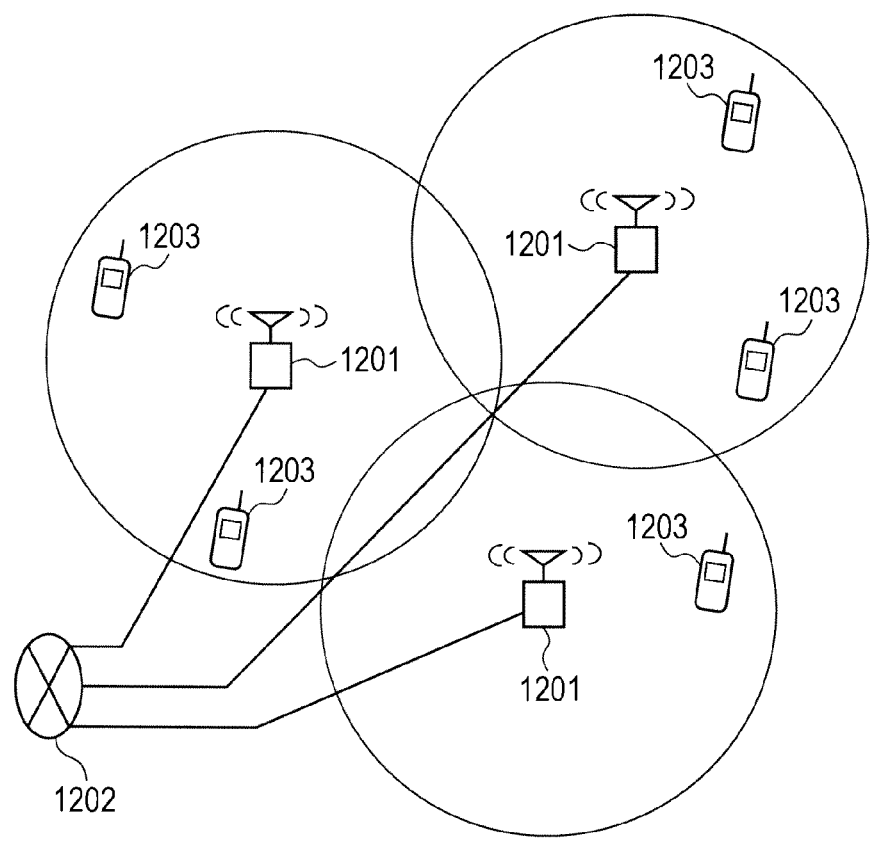
FIG. 1A is a diagram illustrating a cellular radio system.

Some embodiments for implementing the present invention will now be described. These embodiments may be performed separately or in combination. In the following description, components marked with identical reference numerals in the drawings perform identical operations and, therefore, their duplicative descriptions are omitted.

1. First Embodiment

FIG. 1A is a diagram exemplifying a cellular radio communication system architecture and base stations. The cellular radio communication system includes, for example, a plurality of base stations 1201. Each base station 1201 communicates by radio with a terminal 1203 within its cell. Each base station 1201 is connected to a core network 1202 through a backhaul link.

Figure 1B:
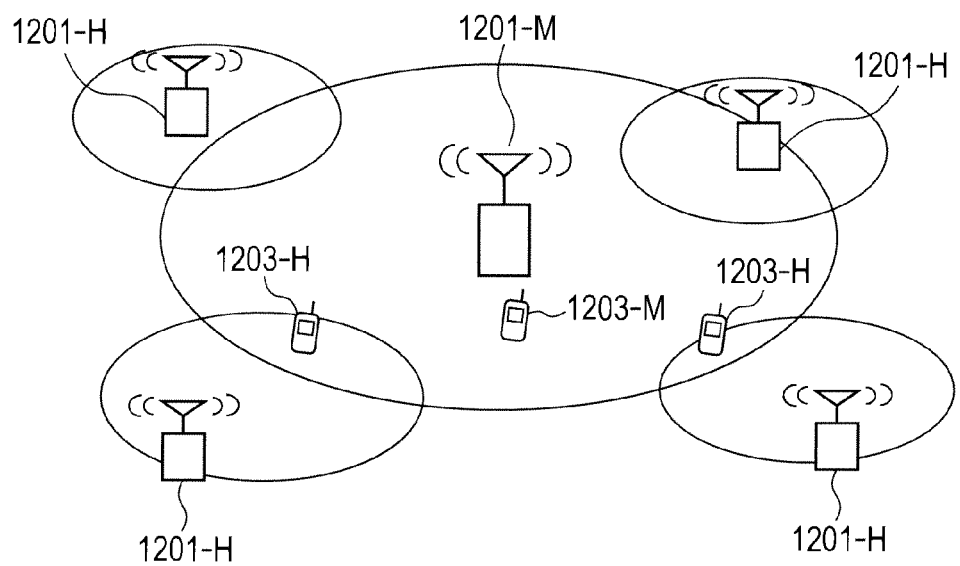
FIG. 1B is a diagram illustrating a heterogeneous network.

FIG. 1B is a conceptual diagram of a heterogeneous network in which one or plural small base stations and a macro-cell base station (large base station) coexist. Base stations for femto cells, pico cells, etc. are deployed at a higher density in comparison with macro-cell base stations. An area covered by each of these base stations may overlap with an area covered by a macro cell. For example, both areas may partially overlap with each other or one area may be included in the other area. In the present embodiment, a large base station means, for example, a base station having a larger cell (or a wider radio wave arrival range) and a small base station means, for example, a base station having a smaller cell (or a narrower radio wave arrival range). It should be noted that the present embodiment can apply to suitable base stations not limited to the base stations for femto cells, pico cells, etc.

In the following description, a small base station is denoted as a base station 1201-H and a terminal which is attached to and communicates with a small base station is denoted as a terminal 1203-H. Similarly, a macro-cell base station is denoted as a base station 1201-M and a terminal (MUE) connected to a macro-cell base station is denoted as 1203-M. When noting a certain base station 1201, a terminal communicating with the base station (a terminal served by the base station) is denoted as a terminal 1203-S, whereas a terminal which is attached to a neighboring base station 1201-N adjacent to the above base station 1201 and communicates with the neighboring base station (or a terminal not served by the above base station) is denoted as a terminal 1203-N.

Figure 2:
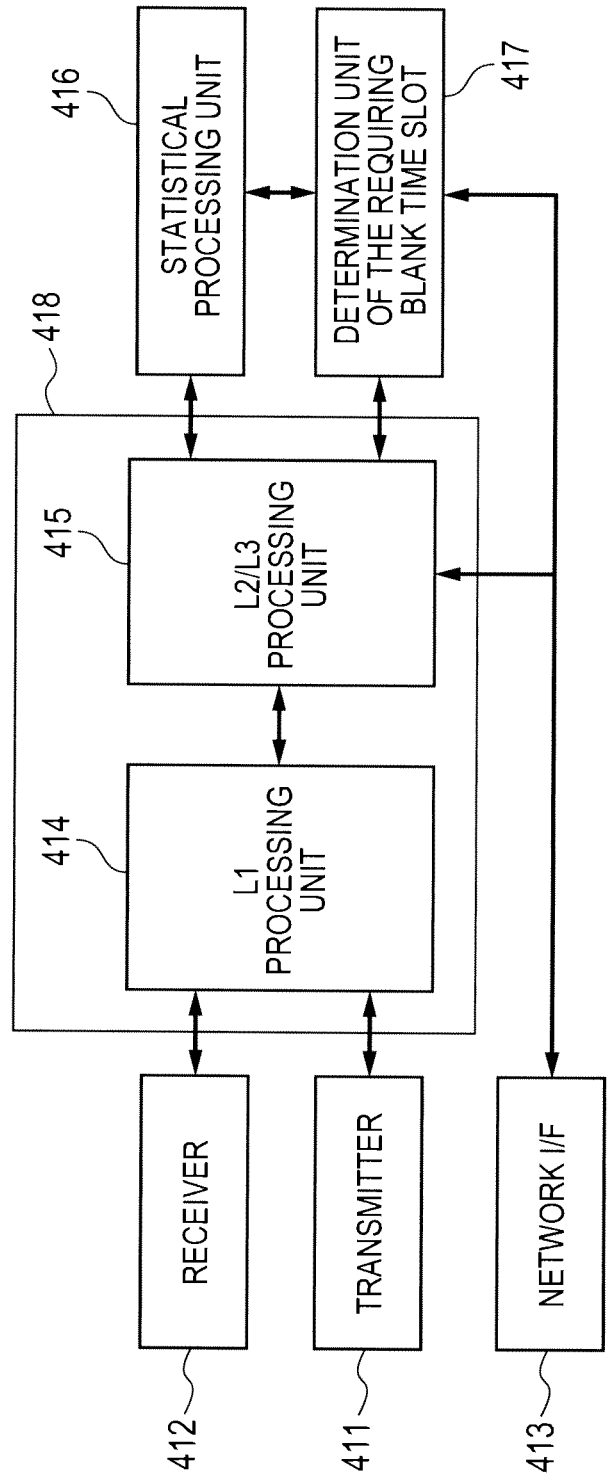
FIG. 2 is a functional block diagram of a small base station according to a first embodiment.

FIG. 2 shows a functional block diagram of a small base station 1201-H according to the present embodiment.

A transmitter 411 is a block by which the base station 1201 transmits a downlink signal to a terminal 1203. The transmitter block may include a process of downlink signal conversion from a baseband signal to an RF (Radio Frequency) signal. The transmitter block also includes a transmitting antenna for transmitting radio waves.

A receiver 412 is a block by which the base station 1201 receives an uplink signal from a terminal 1203-S and a terminal 1203-N. The receiver block may include a process of uplink signal conversion from an RF signal to a baseband signal. The receiver block also includes a receiving antenna for receiving radio waves. A single antenna may be used for both transmitting and receiving.

A network I/F (network interface) 413 is an interface for the base station 1201 to connect to a core network 1202 through a backhaul link. By connecting to the core network 1202, it is possible to provide the functions of the cellular radio communication system, such as information exchange between base stations, mobility management, communication with an OAM device, transmitting and receiving data desired by a terminal 1203, and calls.

A communication processing block 418 includes an L1 (Layer 1) processing unit 414 and an L2/L3 (Layer 2/Layer 3) processing unit 415 and performs processing according to radio protocol standards.

The L1 processing unit 414 is a part in which the base stations 1201 performs physical layer signal processing. Main transmitting processes are, for example, adaptive modulation, error correction and coding, MIMO (Multiple Input Multiple Output) signal processing called layer mapping and precoding, and FFT (Fast Fourier Transform). Main receiving processes are, for example, demodulation and decoding to undo the effects of modulation and coding performed by a transmitter. Data for transmission to a terminal 1203 is acquired from the L2/L3 processing unit 415 and data acquired from a terminal 1203 is sent to the L2/L3 processing unit 415.

The L2/L3 processing unit 415 is a block having functions such as HARQ (Hybrid Automatic Repeat request) management, scheduling for assigning radio resources, packet processing, radio channel concealment, and generation of signaling information to a terminal and, in addition, having a radio resource management function such as inter-cell interference control. Also, the L2/L3 processing unit 415 determines a terminal 1203 to which radio resources are assigned for the same time slots as blank time slots according to information for blank time slots notified through the network I/F 413.

A statistical processing unit 416 is a block that gathers measurement results which are reported from terminals 1203 for the purpose of performing a process according to the present embodiment. From the measurement results, a positional relation between a served terminal 1203-S and a neighboring base station 1201-N can be grasped.

A required blank time slots determination unit 417 is one of functional blocks specific to the present invention. Based on measurement result information managed by the statistical processing unit 416, this unit verifies for proper allocation of blank time slots and, accordingly, generates an indicator of the number of terminals with which communication needs to be protected. The required blank time slots determination unit 417 determines whether currently allocated blank time slots are sufficient. If there is an excess or a shortage of blank time slots, this unit generates and sends information for an adjustment request to a base station that transmits (allocates) blank time slots via the network I/F (notification unit) 413.

Figure 3:
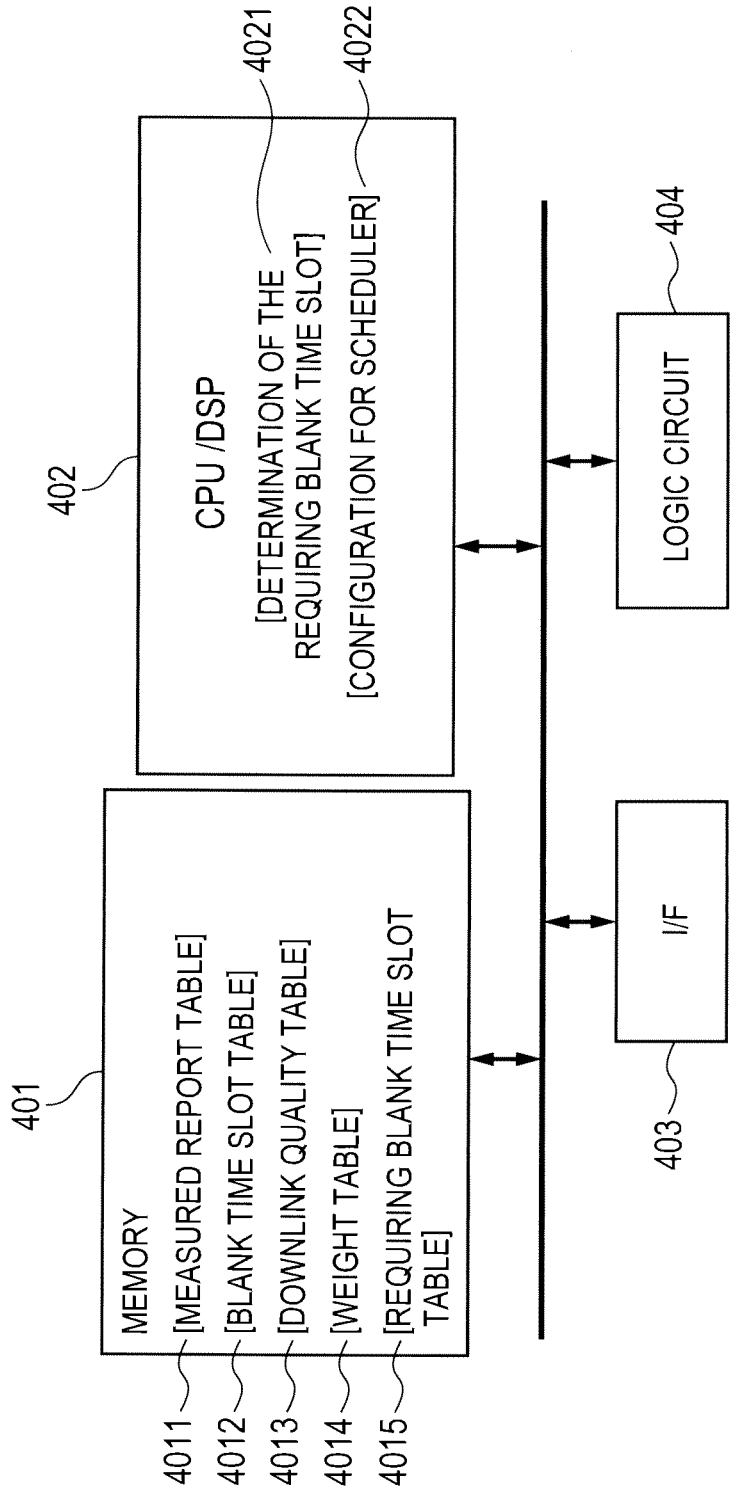
FIG. 3 is a hardware structure diagram of a small base station according to the first embodiment.

FIG. 3 shows a hardware structure of a small base station 1201-H according to the present embodiment.

A memory 401 holds, for example, a measured report table 4011 that gathers power measurement results which are reported from terminals. This table is managed by the statistical processing unit 416. The memory 401 also holds a blank time slot table 4012 for currently allocated blank time slots and a downlink quality table 4013 that stores downlink quality information.

In the measured report table 4011, for example, correlated with a base station ID (identifier) and a terminal ID, a measurement value of received power at the terminal that received a radio signal from the base station is stored. Downlink quality information that is stored in the downlink quality table 4013 may be indexed information such as CQI.

The memory 401 further holds a weight table 4014 and a required blank time slot table 4015 which will be described later with reference to FIG. 9 and FIG. 10. Each table may be a storage area of a suitable form not limited to a table form.

A CPU/DSP (processor) 402 executes a series of procedures according to the present invention. The CPU/DSP executes processes for, for example, determination of required blank time slots and reconfiguration for scheduler in order to transmit information to be transmitted for blank time slots. The programs for implementing these processes may be, for example, stored in the memory 401 and read by the CPU/DSP 402 or may be stored in an internal memory of the CPU/DSP 402.

A logic circuit 404 supports the function of a program that is executed by the CPU/DSP 402. For example, the L1 processing unit 414 or the like may preferably make use of an accelerator for speeding up processing.

By processing by the CPU/DSP 402 and the logic circuit 404, the function of each block shown in FIG. 2 is implemented.

An I/F (interface) 403 is a term that collectively refers to an interface with a radio antenna, an interface with a backhaul link, and the like.

Figure 4:
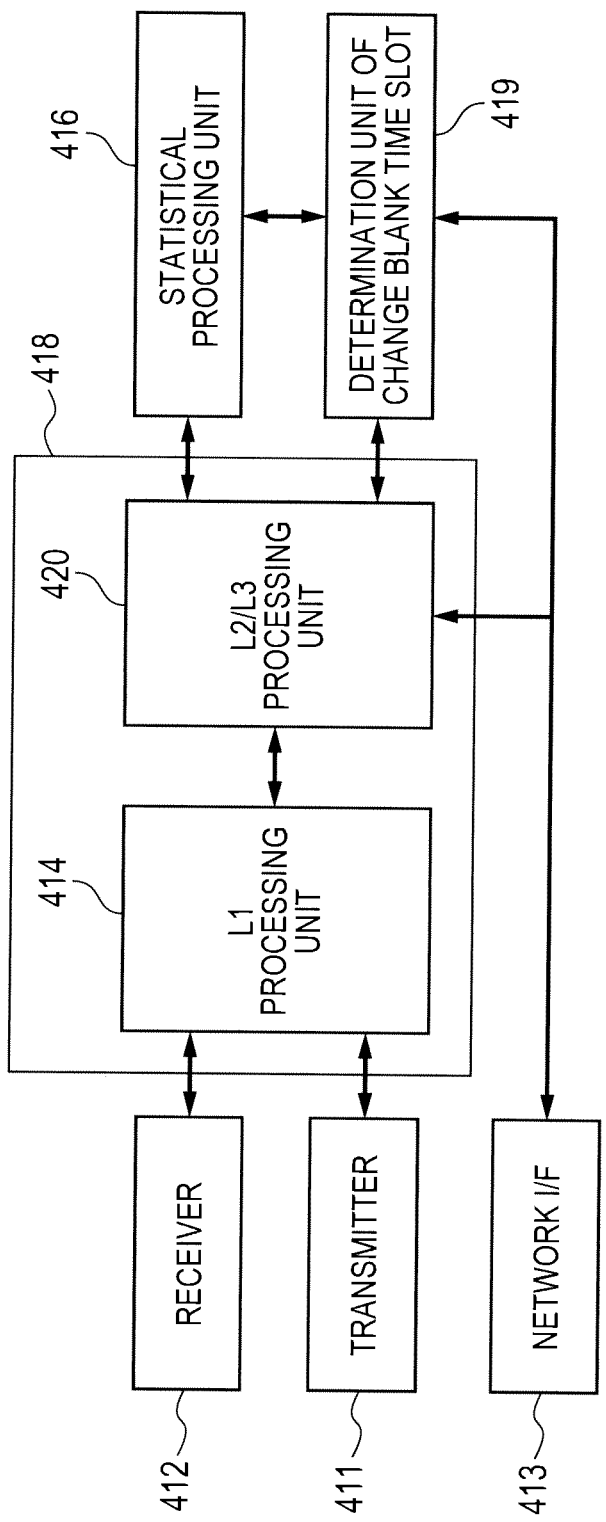
FIG. 4 is a functional block diagram of a macro-cell base station according to the first embodiment.

FIG. 4 shows a functional block diagram of a macro-cell base station 1201-M according to the present embodiment.

Difference from a small base station 1201-H lies in that the macro-cell base station has a determination unit for changing blank time slots 419 instead of the required blank time slots determination unit 417, because this base station is responsible for providing blank time slots. This functional block 419 determines whether changing blank time slots is needed based on blank time slots change requests received through a network I/F 413. If having determined that the change is needed, the determination unit 419 notifies an L2/L3 processing unit 420 of a configuration change and notifies other base stations 1201 of changed blank time slots via the network I/F (notification unit) 413.

Upon receiving a notification of configuration change by changed blank time slots, the L2/L3 processing unit 420 modifies parameters so that downlink radio resources will not be used for the blank time slots. Blocks marked with the same reference numerals as in FIG. 2 are the same as the corresponding blocks in the small base station described above.

Figure 5:
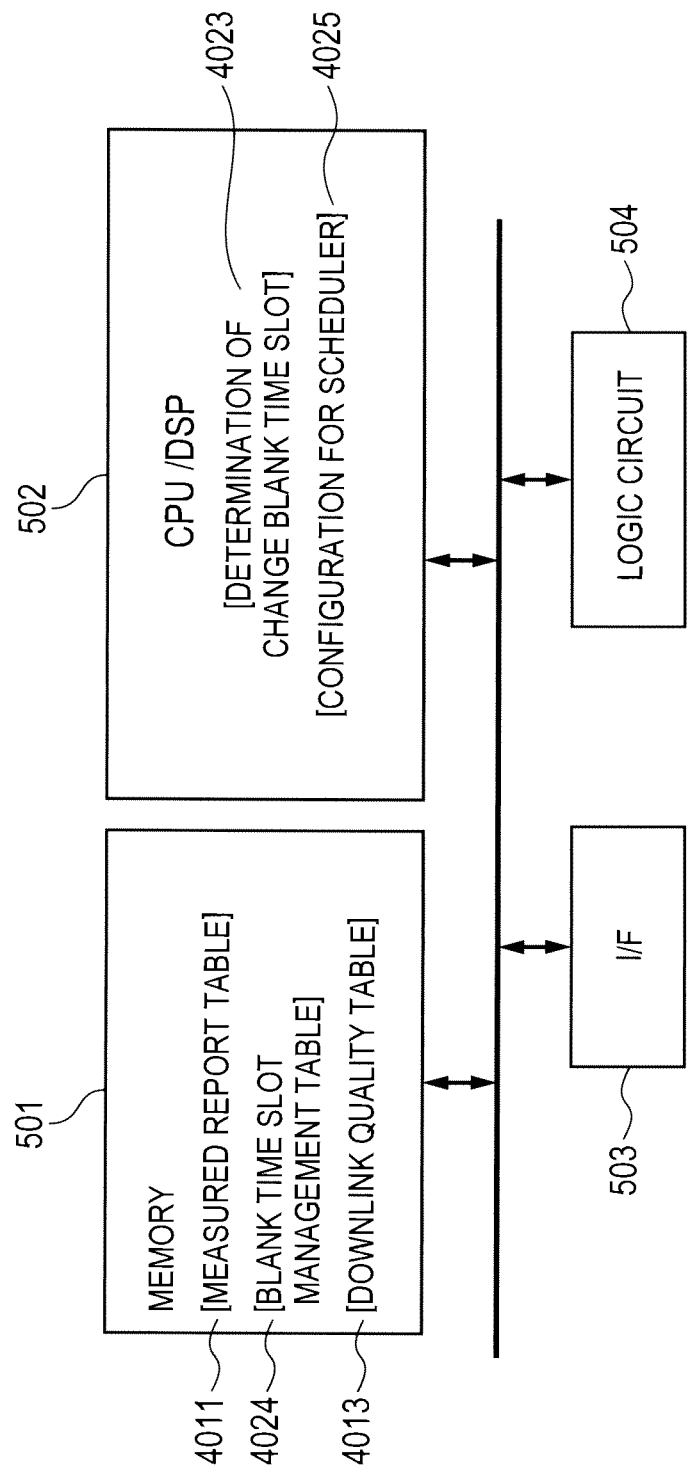
FIG. 5 is a hardware structure diagram of a macro-cell base station according to the first embodiment.

FIG. 5 shows a hardware structure of a macro-cell base station 1201-M according to the present embodiment.

In a memory 501, there is a blank time slot management table 4024. The blank time slot management table 4024 holds information on a request to change blank time slots received from a small base station 1201-H as well as information for blank time slots that are currently applied by the base station 1201 itself.

A CPU/DSP 502 has a function that implements a change to a blank time slot pattern, i.e., a process for determination for changing time slots 4023.

The CPU/DSP also has a function 4025 that implements a change to configuration used for scheduling of a base station 1201, when a pattern of blank time slots is changed.

Figure 6:
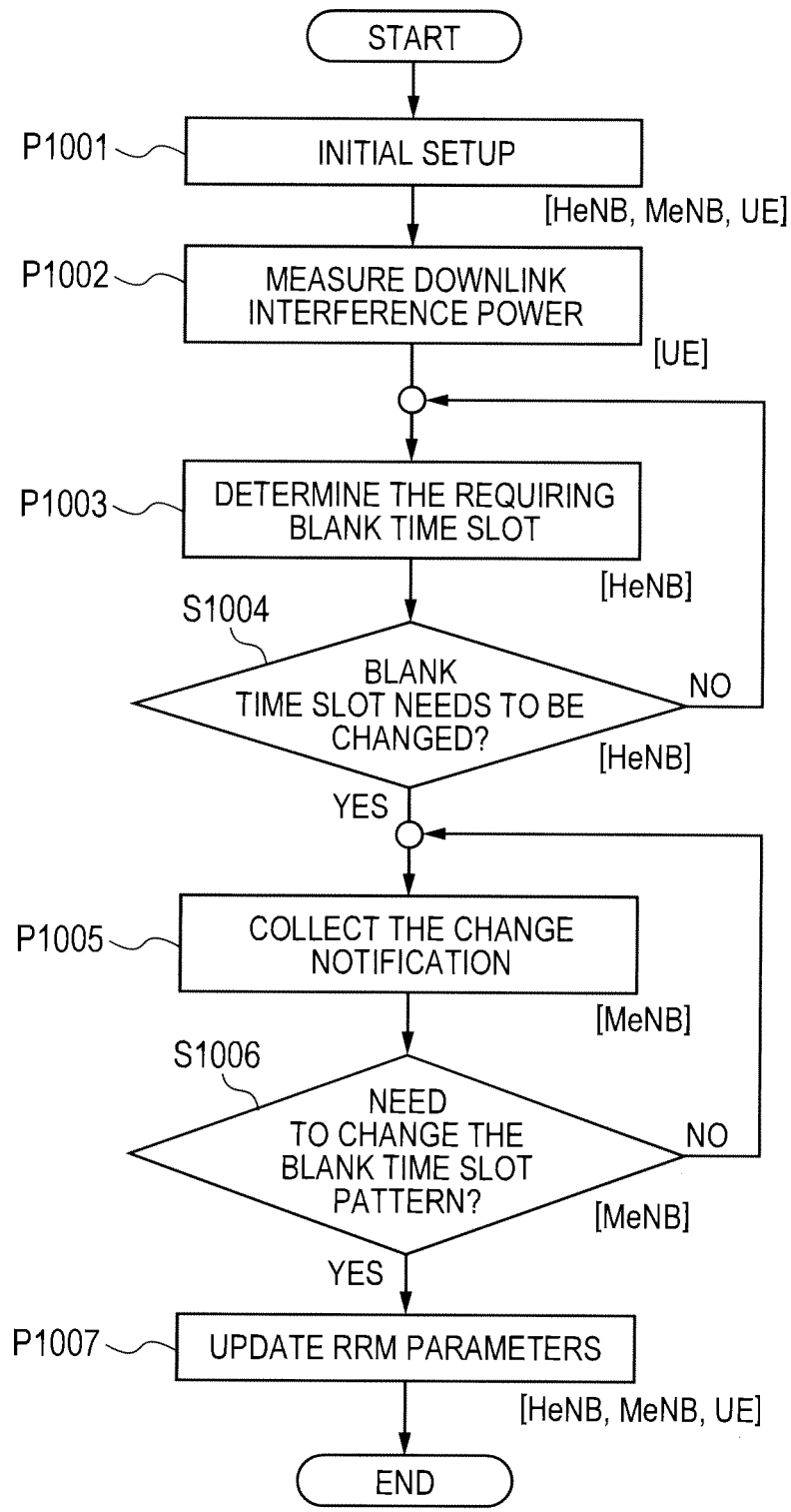
FIG. 6 is a flowchart describing a system-wide operation of the present system.

FIG. 6 is a flowchart illustrating a system-wide operation according to the present embodiment.

There are a plurality of embodiments of the present invention according to different scenarios. A process that is performed at a node in one scenario is performed at another node in another scenario and the interfaces for notification interchange their roles accordingly. In the first embodiment, the following description assumes a case where a small base station 1201-H determines whether changing blank time slots is needed and sends a request notification to a macro-cell base station 1201-M that carries out a change to blank time slots.

This flowchart represents a flow of processing in the system when viewed from an overall perspective and a processing executor differs from one step to another. First, each base station 1201 and each terminal 1203 perform initial setup for collecting interference information (P1001). According to this setup, a terminal 1203 measures downlink signal interference power and reports it to its serving base station 1201 (P1002). From the reported interference information, a small base station 1201-H determines whether currently assigned blank time slots are proper (P1003). If changing the blank time slots is needed, the small base station 1201-H sends a change request notification to a large (macro-cell) base station 1201-M that assigns blank time slots. The large base station 1201-M collects blank time slots change requests notified from one or plural base stations 1201 (P1005), determines whether it needs to change the blank time slots (blank time slot pattern) (P1006). If the macro-cell base station 1201-M changed the blank time slots (blank time slot pattern), updating parameters that are used for scheduling and measurement is performed (P1007). The large base station 1201-M notifies base stations engaged in cooperative communication of actually changed blank time slots and each base station 1201 updates the above parameters.

Figure 8:
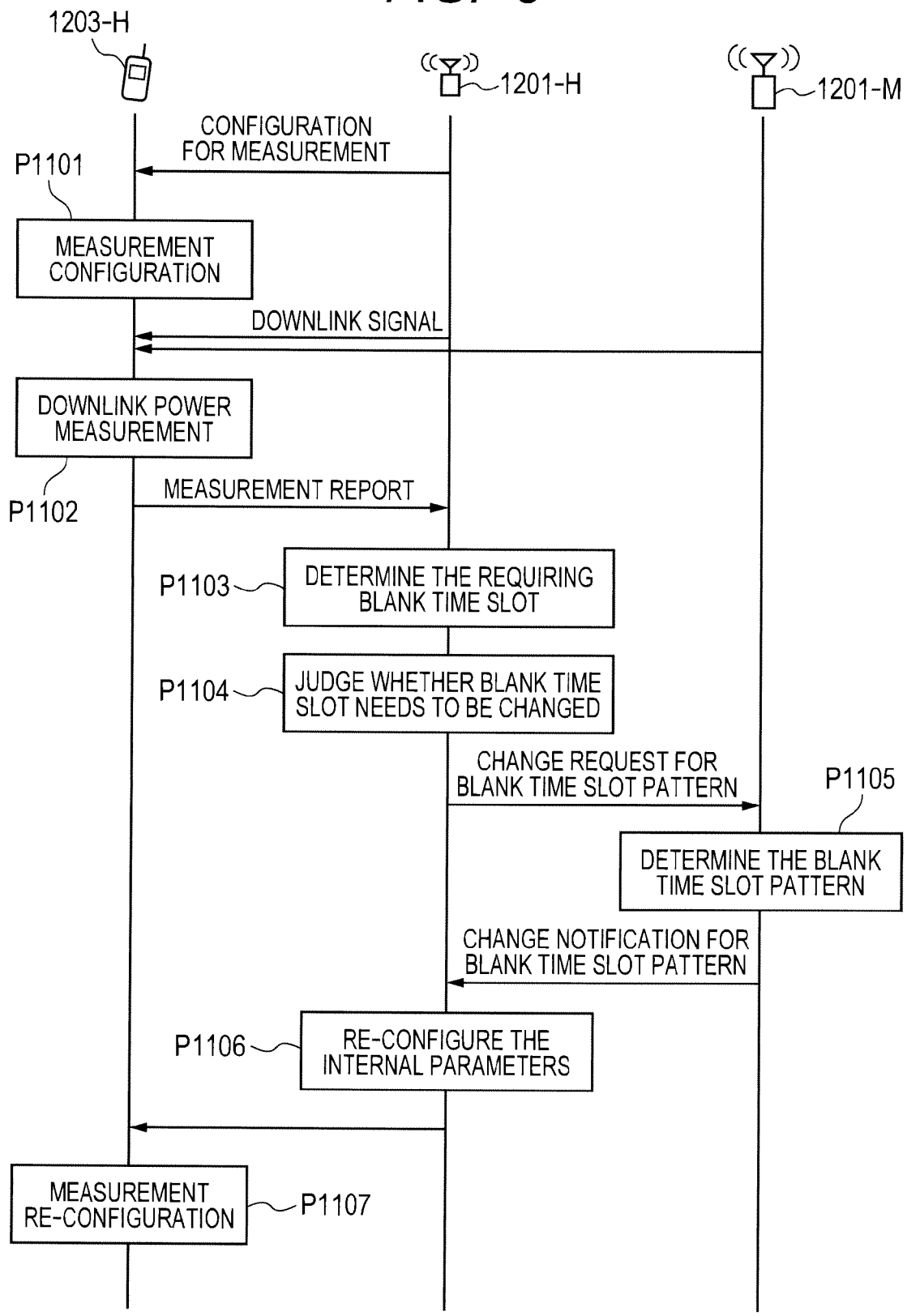
FIG. 8 is a sequence diagram for explaining operation according to the first embodiment.

Then, operation according to the first embodiment is explained using a sequence diagram of FIG. 8.

The sequence diagram of FIG. 8 represents the system-wide operation including the respective operations of a macro-cell base station 1201-M, a small base station 1201-H, and a terminal 1203-H connected to the small base station.

In initial setup, the macro-cell base station (1201-M) and the small base station (1201-H) sets up initial values of system parameters. This setup method may be either reading of preinstalled data or downloading config parameters from a management device. Setup details are, for example, parameters of RRM (Radio Resource Management) and parameters for interfacing with an external device.

Using setting values, the small base station 1201-H sends configuration information about downlink received power measurement to each terminal 1203-H served by it. For instance, in LTE, which is a radio communication system adopting an OFDMA scheme, it will be expedient that Measurement Config is provided from the base station to the terminal to set up an event trigger so that the terminal can measure power from a neighboring cell.

Upon receiving the above configuration information (P1101), the terminal 1203-H performs downlink received power measurement (P1102). Radio signals to be measured by the downlink received power measurement include those from the small base station 1201-H of a serving cell for the terminal 1203-H and those from a base station 1201-N of a neighboring cell. The cell of the macro-cell base station 1201-M overlaps with the cell of the small base station 1201-H and these cells may have an adjacency relationship. The terminal 1203-H reports measured power information to the small base station 1201-H. The small base station 1201-H stores reported power information as a set of the identifier of the reporting terminal, the identifier of the transmitting base station as to the measured power, and the power information into the measured report table 4011-H.

Figure 7:
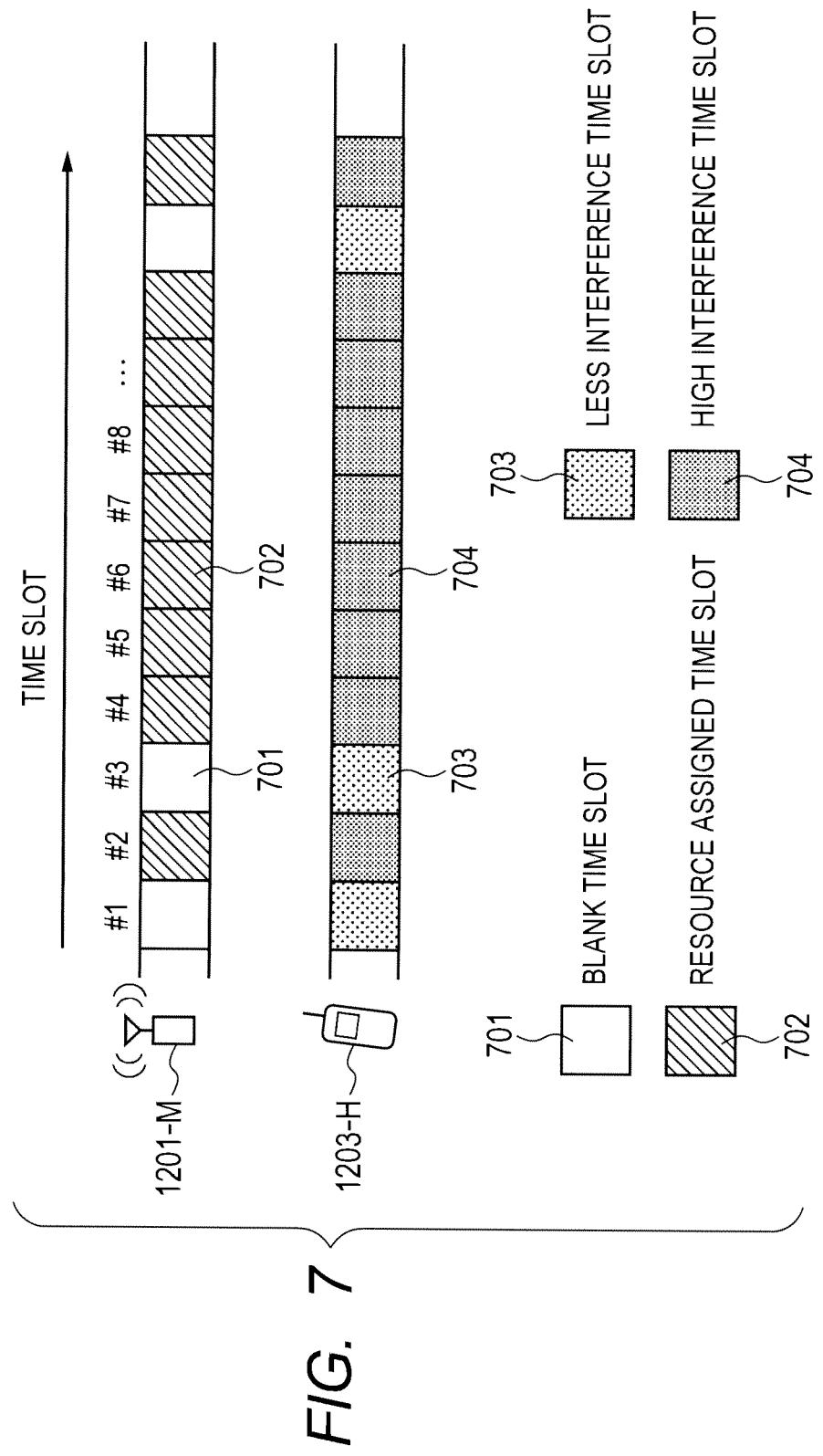
FIG. 7 is a diagram for explaining blank time slots.

FIG. 7 shows an example of blank time slots. For a time slot to which the macro base station 1201-M assigned a blank time slot 701, there is a smaller interference power experienced by a terminal 1203-H served by a small base station (703). In contrast, in the case of time slots to which the macro base station 1201-M assigned radio resources normally, there is a larger interference power experienced by the terminal 1203-H than the case of a blank time slot assigned (704). The small base station 1201-H that controls the serving cell for the terminal 1203-H should expediently select and use a less interference time slot 703 to communicate with a terminal located near the cell edge adjoining the macro-cell base station 1201-M. However, as the number of terminals 1203-H increases, insufficiency may occur only with the currently assigned number of blank time slots 701. Conversely, as the number of terminals 1203-H decreases, black time slots more than required are assigned, which may result in deterioration in overall system throughput.

In order to take countermeasures against this, the small base station 1201-H performs the following process. First, the small base station 1201-H calculates required blank time slots enough to ensure sufficient quality of communication from the number of terminals and reported power measurement values (P1103).

For example, the number of terminals located near the cell edge is assumed as an input key and the base station 1201-H introduces a cost function calculated by multiplying the number of terminals that sent a measurement report by a weight for each of predetermined ranges based on power measurement results, for example, as shown in FIG. 9. As the power measurement results, SIR (or SINR) which is a ratio between signal power from the home cell and interference power from another cell may expediently be used. Referring to measurement report values reported from terminals 1203-H, a ratio between received power from the home cell and received power from a cell transmitting blank time slots (ABS: Almost Blank Subframe) (or a cell other than the home cell) may expediently be obtained.

Besides, CQI (Channel Quality Indication) values, PHR (Power HeadRoom) which is a margin of uplink transmission power, or the like reported from terminals 1203-H may be assumed as an input key. For example, because a lower CQI or smaller PHR indicates a user located near the cell edge, CQI or PHR may be used instead of SIR.

Alternatively, based on power measurement results, weights may be set so that a larger weight is applied to a terminal receiving large interference power from a base station that provides blank time slots (a terminal located near the edge between the home cell and the cell of that base station) and smaller weight is applied to a terminal receiving smaller interference power. It is also meant that the more the number of terminals, the larger will be the value of the cost function. An increase in the number of terminals connected to the home cell base station indicates that a tolerable amount of interference experienced by the terminals lacks, thus resulting in a stronger demand to allocate more ABS subframes. That is, by introducing the above cost function, it is possible to evaluate an amount of interference experienced by terminals, taking account of both how many terminals are served by the base station (base station's load) and how large interference power is experienced by the served terminals.

Alternatively, the cost function may be calculated such that power measurement results that are less than a predetermined threshold (indicating interference larger than a criterion) are weighted by 1 and those satisfying the threshold are weighted by 0. Depending on the number of terminals 1203-H determined to lie near the cell edge by the base station 1201-H simply by thus calculating the cost function, it is possible to calculate a required number of ABS subframes. For example, this way of cost function calculation corresponds to setting weight of 1.0 for SINR of or less 0 to 1.0 and weight of 0.0 for SINR larger than 0 in the example of FIG. 9. This setting is sensitive to detecting cell-edge UEs, but an impact affecting cell-center terminals becomes hard to take in consideration. Weights can be adjusted depending on relationship with a surrounding cell.

From a mapping table (required blank time slot table) between a total of cost functions discussed above and required blank time slots, as shown in FIG. 10, required blank time slots at the current instant are calculated. In such a mapping table, preinstalled values may be used or values may be set from an upper layer management device.

Referring to FIG. 9 and FIG. 10, the process P1103 is explained more specifically with regard to an example of using power measurement results. As shown in FIG. 9, the ranges of power measurement results and weights associated with each range are predetermined and stored in, for example, the weight table 4014. The small base station 1201-H obtains an indicator such as SIR for each terminal based on power measurement results stored in the measured report table 4011-H and obtains the number of terminals for each predetermined range shown in FIG. 9. The small base station 1201-H multiplies the number of terminals for each range by the weight associated with the range, sums up the results of multiplications for all the ranges, and obtains a total value of the cost functions (an indicator of an amount of interference experienced by terminals). Based on the obtained total value of the cost functions, the small base station 1201-H refers to the required blank time slot table 4015 as shown in FIG. 10 and obtains required blank time slots mapped to the total value.

Then, the small base station 1201-H judges whether the obtained required blank time slots are the same as or differ from the blank time slots allocated before performing this process. If these time slots are the same, the small base station 1201-H waits for the next opportunity of determination. If these time slots differ, the small base station 1201-H sends a change request to the macro-cell base station 1201-M (P1104).

For sending the change request, the interfaces for communication between base stations may be used. Alternatively, the change request may be sent via upper layer management devices existing in the core network 1202.

A value that represents the number of required blank time slots may be sent or both the pattern and the number of blank time slots may be changed to a different pattern of blank time slots from the currently used blank time slots. For instance, in E-UTRA, an interface between base stations (X2 I/F) is standardized. Control information shared between base stations is exchanged using an unit of information called IE (Information Element). A pattern as to which SF is set to be a blank time slot (ABS) during a period of 40 SFs (subframes=time slots) can be notified to a neighboring base station using IE. For example, IE such as ABS Information or ABS Status is expediently used. In this IE, a bit string of 40 bits can be used to specify which subframe is ABS ON/OFF. That is, with a modify requested ABS pattern represented by the bit string and the number of "True" bits, a blank time slots change request can be signaled. It will be expedient that both base stations establish, as a system operation, a rule that a pattern change should be signaled by using this mechanism and sending a request notification for change to the number of ABS subframes and a ABS pattern different from the currently used ABS pattern. An arrangement may expediently be made such that the request receiving base station should decide that it has received a change request when either or both of the number of ABS bits or the number of ABS bits of a different pattern has reached a fixed number or more. Alternatively, IE that directly signals a value representing the number of required ABS subframes may be defined and used.

When having received a blank time slots change request from the small base station 1201-H, the macro-cell base station 1201-M may perform a process for reassigning blank time slots (a blank time slot pattern) (P1105) by using, for example, the determination unit for changing blank time slots 419 (P1105). The macro-cell base station 1201-M typically adjoins one or plural small base stations and receives required blank time slots change notifications from a plurality of small base stations 1201-H. When the macro-cell base station 1201-M changes blank time slots, all small base stations adjoining it are affected by the change. Thus, blank time slots setting change cannot be made in response to a report from only one small base station 1201-H. When changing blank time slots, the macro-cell base station 1201-M expediently decides the change depending on whether overall system throughput increases. That is, for blank time slots change requests from the respective small base stations 1201-H, this decision may expediently be made according to a majority decision between the number of change requests to increase blank time slots and the number of change requests to decrease blank time slots or a total of amounts of change of blank time slots (differences between current blank time slots and required blank time slots). However, change should be decided in a prudent manner, because frequent change entails changing system parameters many times. Decision to increase or decrease blank time slots may be made using a statistical tendency, for example, by collecting change request notifications from the respective small base stations 1201-H for a certain period and applying an average value for the period. When having increased or decreased blank time slots, the macro-cell base station 1201-M notifies the small base stations 1201-H of the changed blank time slots. In consequence of the changed blank time slots, the macro-cell base station 1201-M may need to make a change such as releasing radio resources assigned to the time slots having become blank by periodic scheduling. In this regard, it will be more expedient that blank time slots are set in units of integer multiples so that a small base station easily makes assignments by periodic scheduling, while avoiding interference. For example, it will be expedient that blank time slots are set at intervals of 20 ms to facilitate resource assignments for VoIP traffic or at intervals of 8 ms to facilitate resource assignments for HARQ traffic. In E-UTRA, the current pattern of blank time slots (ABS) may be signaled using ABS Information IE.

Each small base station 1201-H, when having been notified of a changed pattern of blank time slots, may update information that is used for scheduling (P1106). Also, it performs scheduling at appropriate timing. For example, it is assumed that the small base station schedules cell-edge terminals with a pattern of blank time slots and, thus, the base station may reclassify terminals 1203-H into cell-edge terminals and cell-center terminals. Besides, such a method is conceivable that periodic scheduling is used to assign radio resources to blank time slots for which high quality transmission can be expected. For instance, in E-UTRA, there is a scheduling method called SPS (Semi-Persistent Scheduling) in which same radio resources of a same modulation scheme are assigned to time slots at given intervals. By using SPS to assign resources to blank time slots, an effect in which retransmission is unlikely to occur can be expected. Because the blank time slot pattern change also affects time slots for which terminals 1203-H measure power from the macro-cell base station 1201-M, the small base station 1201-H notifies the terminals 1203-H of reconfiguration for measurement. Each terminal 1203-H performs reconfiguration for measurement according to new setting notified from the small base station 1201-H and performs power measurement (P1107).

The above processes P1101-P1107 are repeated cyclically.

According to the present embodiment, it is possible to provide a system in which each small base station 1201-H evaluates an amount of interference and feeds back it to the macro-cell base station 1201-M and, accordingly, the macro-cell base station 1201-M can dynamically change blank time slots.

Figure 17:
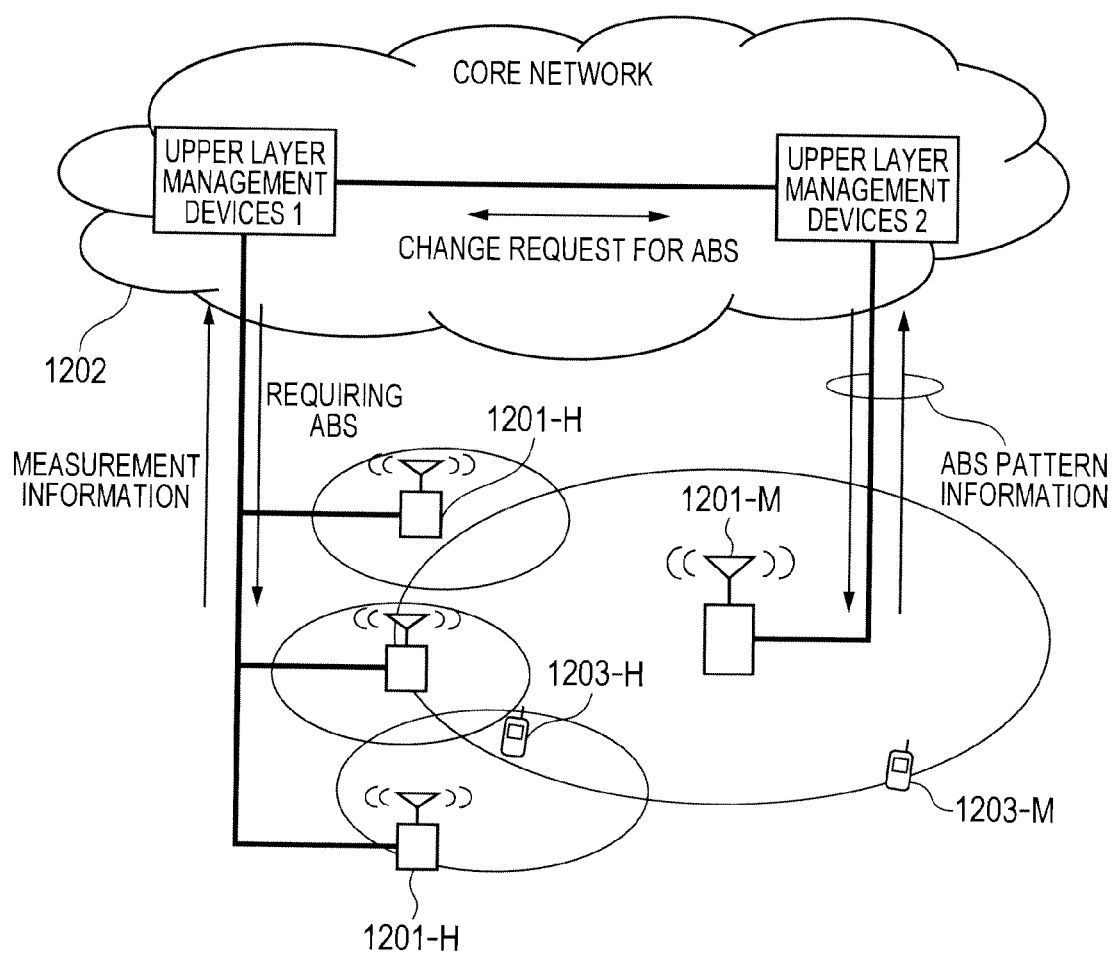
FIG. 17 is a diagram illustrating relocation of control processes in the first embodiment to upper layer management devices.

As is illustrated in FIG. 17, in the present embodiment, a series of processes described above, such as determination for required ABS subframes, ABS change request, and changing an ABS pattern may be relocated to upper layer management devices 1, 2 (FIG. 17).

For example, a radio communication system includes a first base station that assigns a portion of time division radio resources to blank time slots, a plurality of second base stations communicating with terminals using radio resources including the blank time slots, and a management device.

Each second base station receives information representing radio channel conditions or signal quality metrics reported from terminals communicating with the base station and each second base station or the management device calculates required blank time slots per second base station so that the number of required blank time slots will increase with an increase in the number of terminals located near a cell edge between the first base station and the second base station, according to an indicator for evaluating an amount of interference experienced by the terminals based on the information representing radio channel conditions or signal quality metrics for each second base station.

The first base station or the management device receives the required blank time slots per second base station and determines whether to change blank time slots provided by the first base station, based on the respectively required blank time slots.

If it has been determined to change the blank time slots, the first base station increases or decreases the blank time slots.

If the management device calculates the required blank times slots per second base station, each second base station transmits the received information representing radio channel conditions or signal quality metrics to the management device.

If the first base station determines whether to change blank time slots, each of the second base stations or the management device notifies the first base station of the calculated required blank time slots per second base station.

If the management device determines whether to change blank time slots, the management device transmits a result of determination to the first base station.

2. Second Embodiment

A second embodiment relates to a case where a macro-cell base station 1201-M determines whether changing blank time slots is needed and sends a request notification to a small base station 1201 H that carries out a change to blank time slots. Such a case of use of this embodiment is assumed that, for example, a small base station is a CSG base station. The small base station 1201-H does not accept an handover even if a terminal 1203-M attached to the macro-cell base station 1201-M comes close to its cell. That is, in this situation, the terminal 1203-M has to communicate with the macro-cell base station near the source of very high interference. Thus, the CSG base station needs to provide blank time slots according to a certain rule. The macro-cell base station 1201-M may be an appropriate base station other than a CSG base station regardless of cell size.

Figure 11:
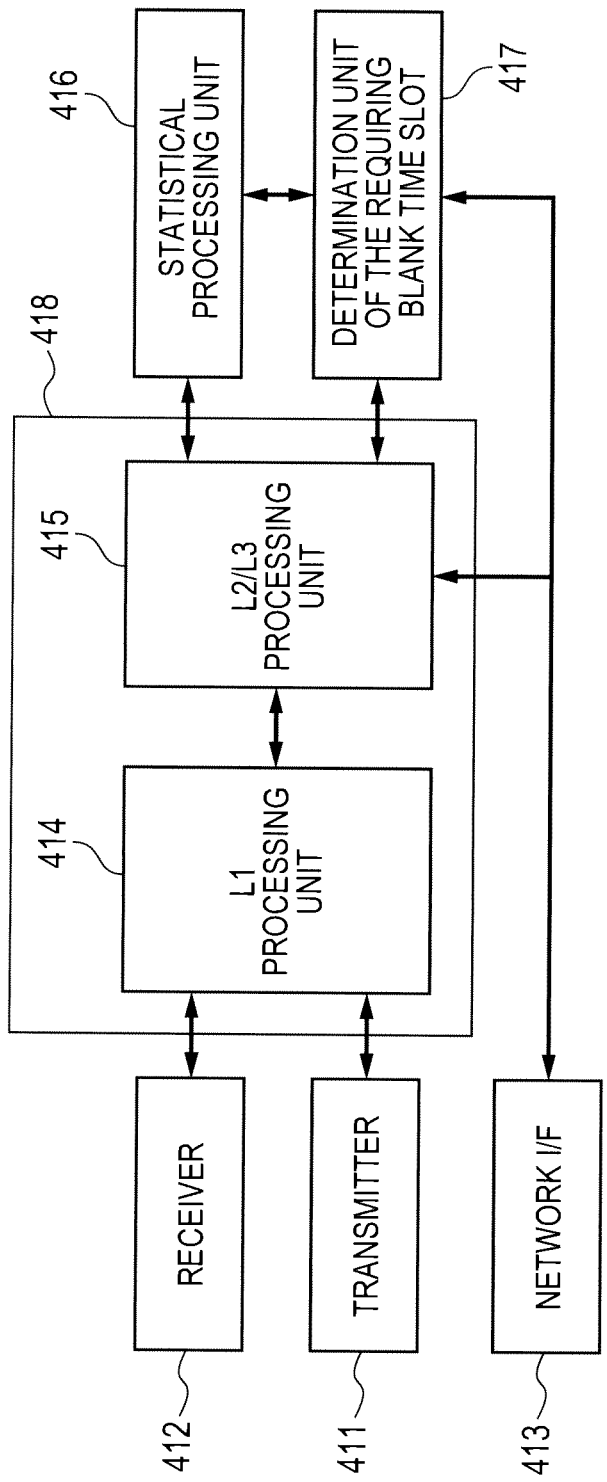
FIG. 11 is a functional block diagram of a macro-cell base station according to a second embodiment.

FIG. 11 shows a functional block diagram of a macro-cell base station 1201-M according to the second embodiment. From a functional viewpoint, the macro-cell base station 1201-M has the functions of a small base station 1201-H of the first embodiment.

Figure 12:
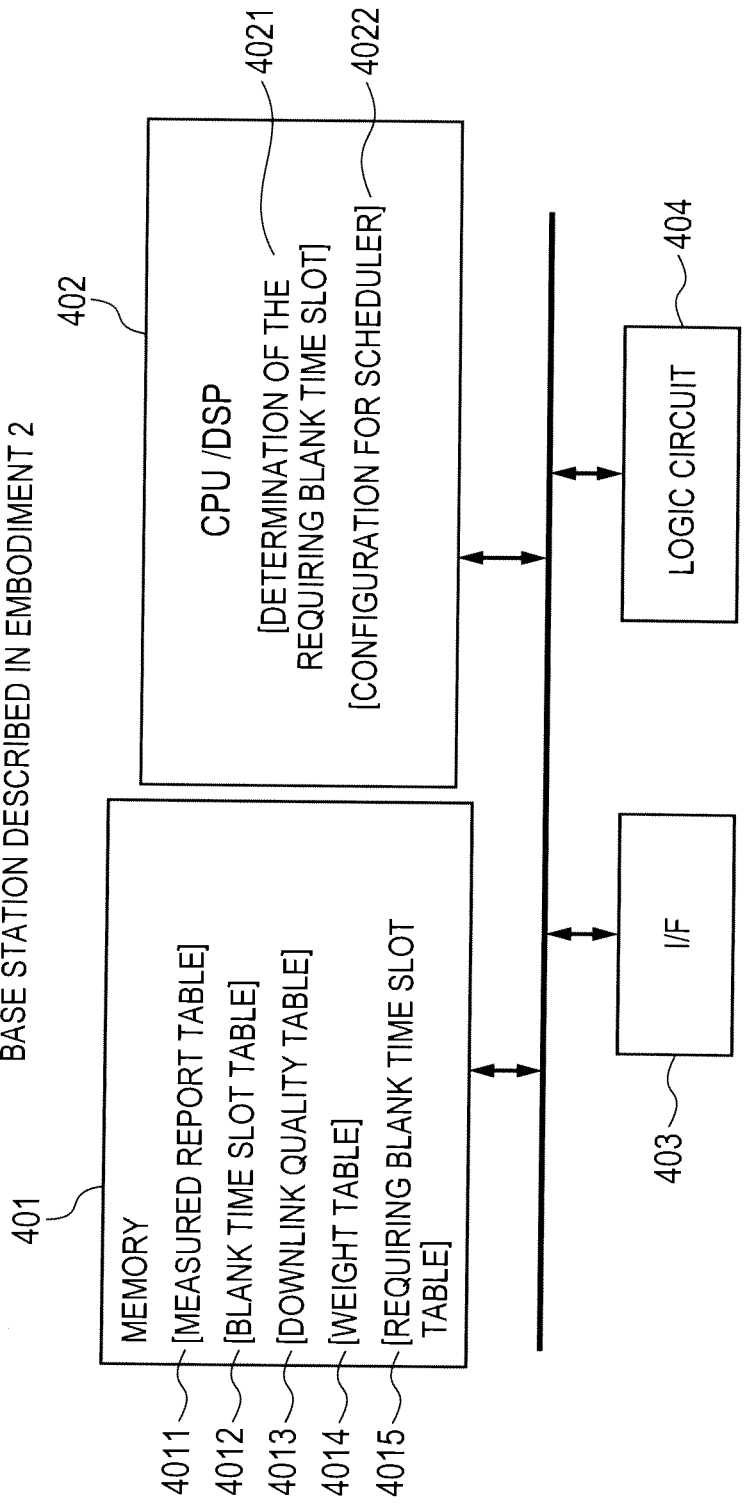
FIG. 12 is a hardware structure diagram of a macro-cell base station according to the second embodiment.

FIG. 12 shows a hardware structure of a macro-cell base station 1201-M according to the second embodiment. Similarly, the macro-cell base station 1201-M has the same hardware structure as that of a small base station 1201-H of the first embodiment.

Figure 13:
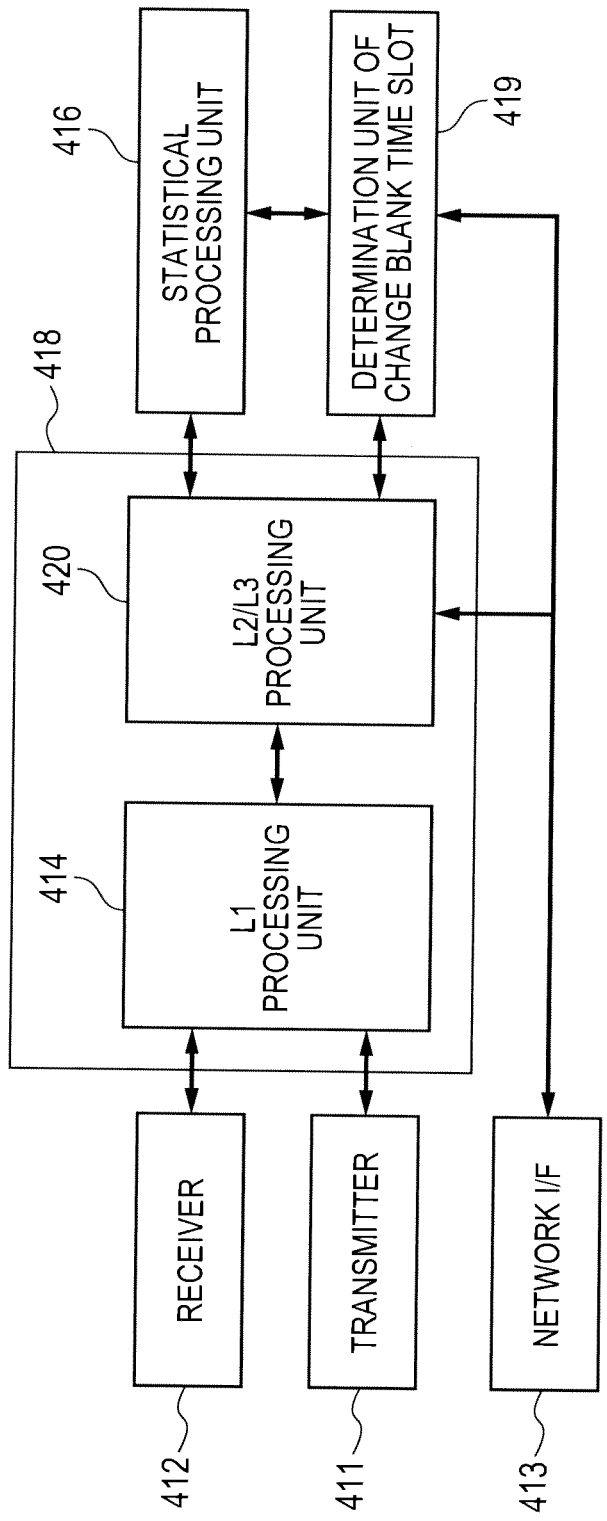
FIG. 13 is a functional block diagram of a small base station according to the second embodiment.

FIG. 13 shows a functional block diagram of a base station 1201-H according to the second embodiment. From a functional viewpoint, the base station 1201-H has the functions of a macro-cell base station 1201-M of the first embodiment.

Figure 14:
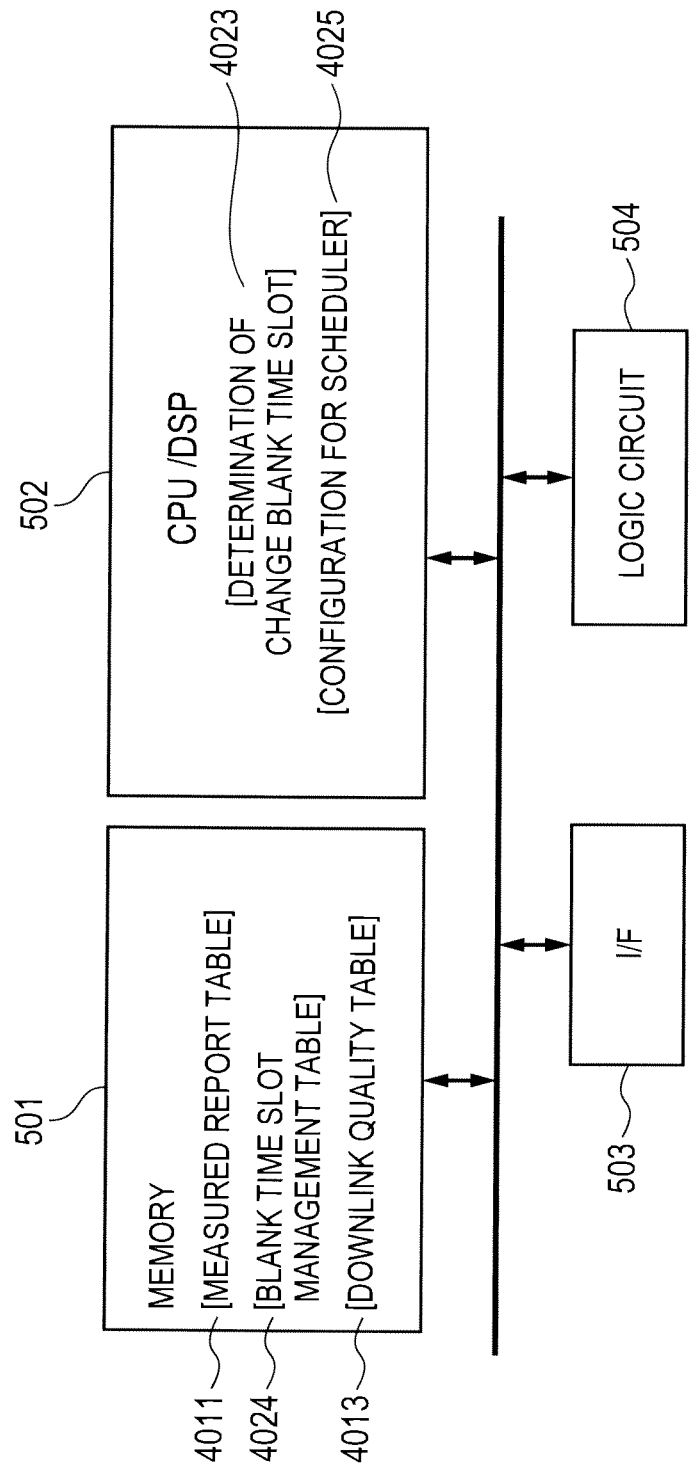
FIG. 14 is a hardware structure diagram of a small base station according to the second embodiment.

FIG. 14 shows a hardware structure of a base station 1201-H according to the second embodiment. Similarly, the base station 1201-H has the same hardware structure as that of a macro-cell base station 1201-M of the first embodiment.

Figure 15:
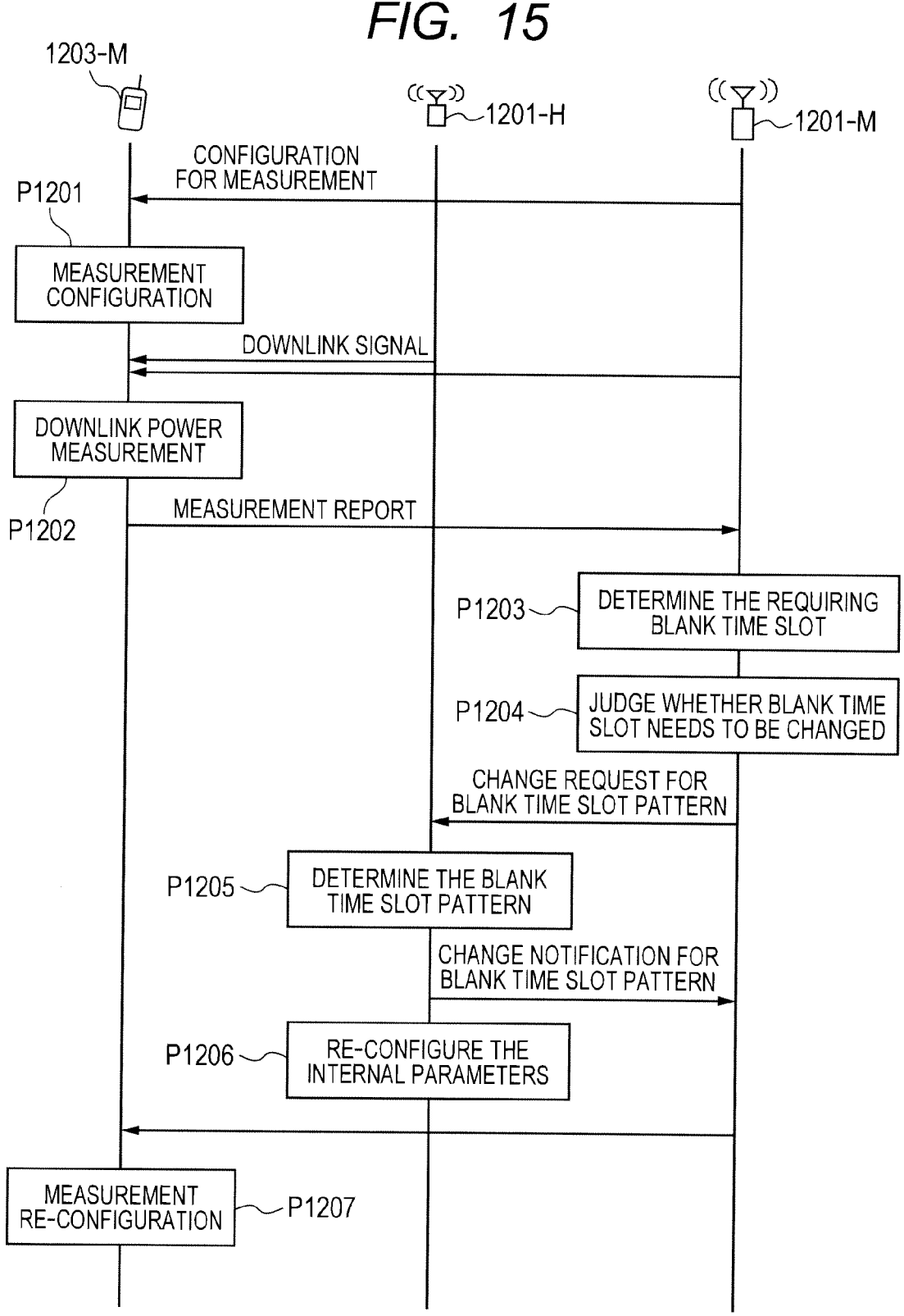
FIG. 15 is a sequence diagram for explaining operation according to the second embodiment.

Operation according to the second embodiment is explained using a sequence diagram of FIG. 15.

In initial setup, the macro-cell base station (1201-M) and the small base station (1201-H) sets up initial values of system parameters. This setup method may be either reading of preinstalled data or downloading config parameters from a management device. Setup details are, for example, parameters of RRM (Radio Resource Management) and parameters for interfacing with an external device. Using setting values, the macro-cell base station 1201-M sends configuration information about downlink received power measurement to each terminal 1203-M served by it. In LTE, which is a radio communication system adopting an OFDMA scheme, it will be expedient that Measurement Config is provided from the base station to the terminal to set up an event trigger so that the terminal can measure power from a neighboring cell.

Upon receiving the above configuration information (P1201), the terminal 1203-M performs downlink received power measurement (P1202). Radio signals to be measured by the downlink received power measurement include those from the macro-cell base station 1201-M of a serving cell for the terminal 1203-H and those from a base station 1201-N of a neighboring cell. The terminal 1203-M reports measured power information to the macro-cell base station 1201-M. The macro-cell base station 1201-M stores reported power information as a set of the identifier of the reporting terminal, the identifier of the transmitting base station as to the measured power, and the power information into the measured report table 4011.

The macro-cell base station 1201-M calculates required blank time slots enough to ensure sufficient quality of communication from the number of terminals and reported power measurement values (P1203). The macro-cell base station 1201-M calculates cost functions for each small base station 1201-H in the same way as the method (e.g., FIG. 9) illustrated with regard to the first embodiment. For example, from a ratio between signal power from the home cell and interference power from each of other cells (here, the cells of surrounding small base stations), SIR with respect to each small base station is obtained and cost functions for each small base station are obtained. However, usually, there could be many small base stations 1201-H for which cost functions should be calculated and, thus, it might become difficult to manage them. Therefore, small base stations may be grouped beforehand and cost functions per group may be calculated.

From the mapping table (required blank time slot table) between a total of cost functions discussed above and required blank time slots, as illustrated with regard to the first embodiment (FIG. 10), the macro-cell base station 1201-M calculates required blank time slots at the current instant. In such a mapping table, preinstalled values may be used or values may be set from an upper layer management device.

Then, the macro-cell base station 1201-M judges whether the calculated required blank time slots are the same as or differ from the blank time slots allocated before performing this process. If these time slots are the same, the macro-cell base station 1201-M waits for the next opportunity of determination. If these time slots differ, the macro-cell base station 1201-M sends a change request to the base station 1201-H or the group of base stations 1201-H (P1204).

For sending the change request, the interfaces for communication between base stations may be used. Alternatively, the change request may be sent via upper layer management devices existing in the core network 1202.

A value that represents the number of required blank time slots may be sent or both the pattern and the number of blank time slots may be changed to a different pattern of blank time slots from the currently used blank time slots.

Figure 16:
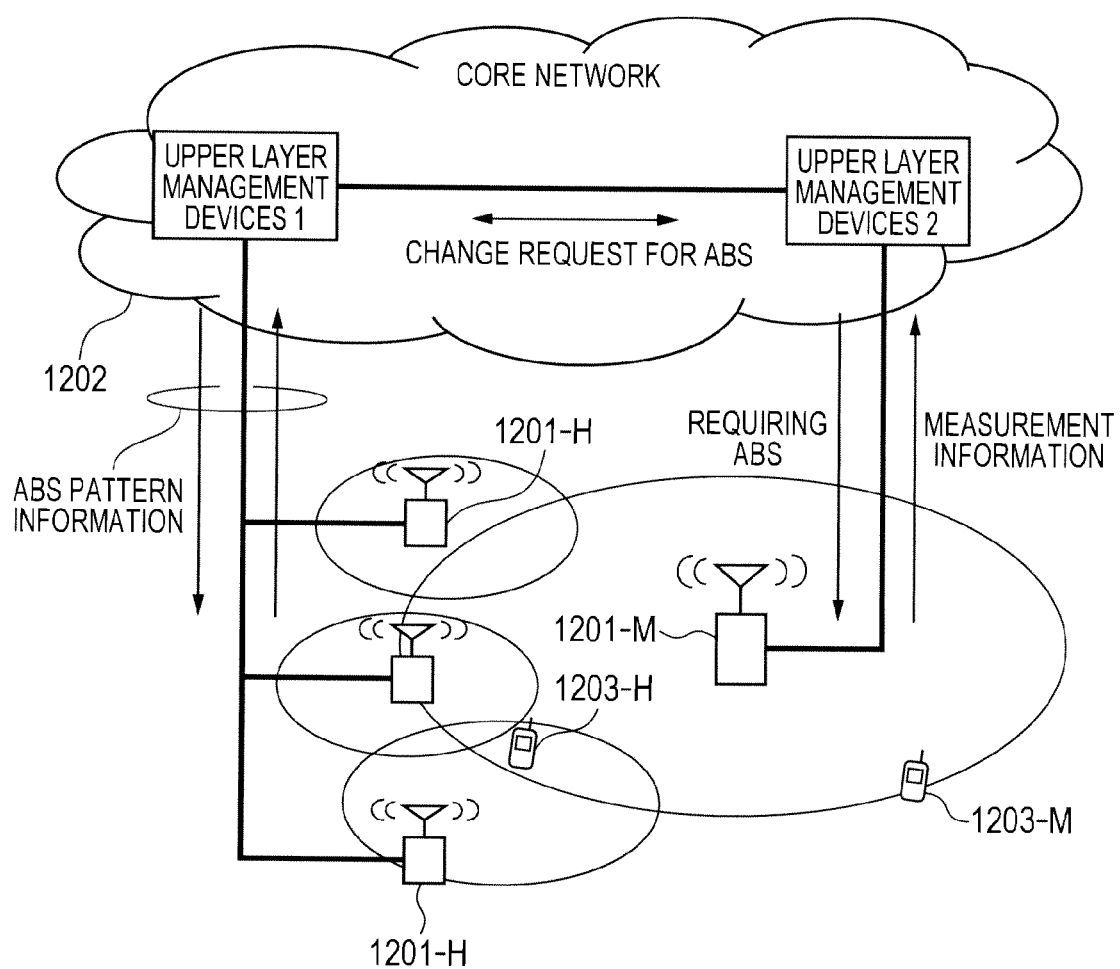
FIG. 16 is a diagram illustrating relocation of control processes in the second embodiment to upper layer management devices.

In a case where setting is requested from the macro-cell base station to a plurality of small base stations and notified via upper layer management devices, either or both of the processes P1203, P1204 may be relocated to the corresponding management device and information for measurement results to be used, inter alia, may be reported to the management device. For example, in an architecture as shown in FIG. 16, the process of collecting power measurement values reported from terminals is performed by the macro-cell base station 1201-M, while a part or all of the subsequent processes of determining requires ABS subframes and sending a change request may be given over to the corresponding management device (of upper layer management devices 1, 2 in FIG. 16) existing in the core network.

The small base station 1201-H receives the blank time slots change request from the macro-cell base station 1201-M or the corresponding upper layer management device via the core network 1202. Upon having received the change request, the small base station 1201-H may perform a process for reassigning blank time slots.

The small base station 1201-H is anticipated to serve a small number of terminals, since, typically, its transmission power is quite small, the number of neighboring cells is few, and connection to it is authenticated. Therefore, even if control accuracy is poor, impact on throughput in its cell is limited. It is important that blank time slots coincide in timing with those for surrounding small base stations 1203-H. That is, the process for reassigning blank time slots may expediently be performed as a part of a system optimization process via upper layer management devices. Also in this case, the base station 1201-H has a function of sending information for control, i.e., an ABS pattern, power measurement results collected from terminals 1203-H, etc. to the corresponding upper layer management device, as shown in FIG. 16.

When having increased or decreased blank time slots, the base station 1201-H notifies the macro-cell base station 1201-M of the changed blank time slots. This notification may be sent via the above upper layer management device or by direct communication between the base stations. Inconsequence of the changed blank time slots, the macro-cell base station 1201-M may need to make a change such as releasing radio resources assigned to the time slots having become blank by periodic scheduling.

The macro-cell base station 1201-M, when having been notified of a changed pattern of blank time slots, may update information that is used for scheduling (P1206). For example, it is assumed that the macro-cell base station schedules cell-edge terminals with a pattern of blank time slots and, thus, the base station may reclassify terminals 1203-H into cell-edge terminals and cell-center terminals. Besides, such a method is conceivable that periodic scheduling is used to assign radio resources to blank time slots for which high quality transmission can be expected.

Because the blank time slot pattern change also affects time slots for which terminals 1203-M measure power from the base station 1201-H, the macro-cell base station 1201-M notifies the terminals 1203-M of reconfiguration for measurement.

Each terminal 1203-M performs reconfiguration for measurement according to new setting notified from the macro-cell base station 1201-M and performs power measurement (P1207).

The above processes P1201-P1207 are repeated cyclically.

According to the present embodiment, it is possible to provide a system in which the macro-cell base station 1201-M evaluates an amount of interference and feeds back it to the base station 1201-H and, accordingly, the base station 1201-H can dynamically change blank time slots.

As one example of the present invention, it is possible to provide autonomous interference control to disperse interference in a cellular radio communication system and such interference control can also be applied in a cellular radio communication system adopting, for example, Orthogonal Frequency Division Multiple Access (OFDMA).

3. Configuration Examples

The present radio communication system is, for example, a radio communication system adopting a method for alleviating interference between a plurality of base stations by assigning a portion of time division radio resources to blank time slots.

The radio communication system includes:
a required blank time slots calculation unit that calculates required blank time slots based on information representing power measured by terminals and according to an indicator for evaluating an amount of interference experienced by the terminals; a base station that notifies the required blank time slots to a base station providing blank time slots via a network; and
a base station that receives the required blank time slots, determines whether it needs to change blank time slots, and performs the changing.

In the radio communication system adopting a method for alleviating interference between a plurality of base stations by assigning a portion of time division radio resources to blank time slots, one of the base stations is a base station including:

a required blank time slots calculation unit that calculates required blank time slots based on information representing power measured by terminals and according to an indicator for evaluating an amount of interference experienced by the terminals.

The base station notifies the required blank time slots to one or plural base stations providing blank time slots via a network.

As regards the foregoing base station, for example, one feature resides in that the indicator for evaluating an amount of interference experienced by the terminals is SINR that is calculated by a ratio between power measured by the terminals from the serving cell of the base station and measured power from a base station that applies the blank time slots and a cost function that is calculated by multiplication by a weight set for each of ranges of SINR values.

As regards the foregoing base station, for example, one feature resides in that the required blank time slots are obtained from a mapping table between values of the above cost function and required blank time slots.

As regards the foregoing base station, for example, one feature resides in that a method for notifying the required blank time slots via the network is transmitting them using an interface between base stations.

As regards the foregoing base station, for example, one feature resides in that the interface between base stations is using IE of X2 I/F of 3GPP E-UTRA.

As regards the foregoing base station, for example, one feature resides in that the IE is ABS Status and a blank time slots change request is signaled with a modify requested ABS pattern represented by a bit string and the number of "True" bits.

As rearguard the foregoing base station, for example, one feature resides in that a method for notifying the required blank time slots via the network is transmitting them via upper layer management devices.

One feature resides in that, in the radio communication system adopting a method for alleviating interference between a plurality of base stations by assigning a portion of time division radio resources to blank time slots, another one of the base stations is a base station that receives the required blank time slots, determines whether it needs to change blank time slots, and performs the changing.

As regards the foregoing base station, for example, the base station is notified of required blank time slots from one or plural neighboring cells and a method for changing blank time slots may be based on a majority decision between requests to increase and requests to decrease the required blank time slots for a given period of time.

As regards the foregoing base station, for example, the base station is notified of required blank time slots from one or plural neighboring cells and a method for changing blank time slots may be based on a cumulative number of increase/decrease in the required blank time slots for a given period of time.

In the foregoing radio communication system, an upper layer management device may perform at least one of the processes of calculating required blank time slots, notification, and determining whether to change blank time slots.

4. Effects of the Embodiments

According to the embodiments described above, interference control is enabled in which autonomous and distributed base stations carry out scheduling in a cooperative manner, while dynamically tracking increase/decrease in traffic and the conditions of surrounding base stations. Although the embodiments differ depending on whether a macro-cell base station or a small base station provides blank time slots, it is possible to provide blank time slots efficiently, since an effect of interference control due to providing blank time slots is fed back from a correspondent base station.

If interference causes no problem, a small number of required blank time slots is fed back. If interference causes a problem, a large number of required blank time slots is fed back.

The embodiments also differ depending on whether such feedback is performed directly between base stations or via upper layer management devices. If the feedback is performed via upper layer management devices, determining the number of required blank time slots as well as the number of blank time slots that are actually set may be performed by the corresponding upper layer management device instead of the base station. In such a case, the base station may expediently have a function of processing information received from terminals into statistical information that can be reported to the upper layer management device and uploading the statistical information.

According to the embodiments described above, it is possible to implement control that optimizes overall system throughput, while minimizing a decrease in throughput of a base station providing blank time slots.

As one example of the present invention, its application to a heterogeneous network comprised of small base stations such as femto-cell and pico-cell base stations and a macro-cell base station is conceivable. It is possible to build a time multiplexing system that optimizes system throughput, while suppressing inter-cell interference autonomously. With higher speed cellular radio communication systems, hot spot areas where communication at high quality can be offered by small base stations will increase in prospect. In this aspect, the present invention can provide a method for cooperation of small base stations with a large base station.

What is claimed is:

1. In a radio communication system comprising a first base station configured to assign a portion of time division radio resources to blank time slots and a plurality of second base stations configured to communicate with terminals using radio resources including the blank time slots, a base station, for use as said first base station, the base station comprising:
  a receiver configured to receive from a plurality of second base stations or a management device required blank time slots per second base station calculated so that the number of required blank time slots will increase with an increase in the number of terminals located near a cell edge between the first base station and the second base station, according to an indicator for evaluating an amount of interference experienced by the terminals based on information representing radio channel conditions or signal quality metrics reported from the terminals for each second base station; and
  a change determination unit configured to determine whether to change blank time slots provided by the first base station, based on the respectively required blank time slots, and increase or decrease the blank time slots when having determined to change the blank time slots,
  wherein the first base station, based on a plurality of notifications of required blank time slots received within a given period of time, is configured to determine whether to change blank time slots provided by the first base station according to a majority decision between the number of requests to increase the required blank time slots more than the current blank time slots and the number of requests to decrease the required blank time slots less than the current blank time slots.

2. The base station according to claim 1, wherein, when the first base station changes blank time slots provided by the first base station, the first base station is configured to notify the second base stations of new blank time slots.

3. The base station according to claim 1, wherein the receiver is configured to receive from the second base station a blank time slots change request signaled with a modify requested blank time slots pattern represented by a bit string and a number of bits set to "True".

4. An interference handling method in a radio communication system comprising a first base station that assigns a portion of time division radio resources to blank time slots, a plurality of second base stations communicating with terminals using radio resources including the blank time slots, and a management device, the interference handling method comprising:
    receiving by each second base station information representing radio channel conditions or signal quality metrics reported from terminals communicating with the base station;
    calculating by each second base station or a management device required blank time slots per second base station so that the number of required blank time slots will increase with an increase in the number of terminals located near a cell edge between the first base station and the second base station, according to an indicator for evaluating an amount of interference experienced by the terminals based on the information representing radio channel conditions or signal quality metrics for each second base station;
    receiving the required blank time slots per second base station and determining by the first base station or a management device whether to change blank time slots provided by the first base station based on the respectively required blank time slots, and increasing or decreasing the blank time slots by the first base station when having determined to change the blank time slots; and
    based on a plurality of notifications of required blank time slots received within a given period of time, determining whether to change blank time slot by the first base station according to a majority decision between the number of requests to increase the required blank time slots more than the current blank time slots and the number of requests to decrease the required blank time slots less than the current blank time slots.

5. The interference handling method according to claim 4, further comprising transmitting by the second base stations received information representing radio channel conditions or signal quality metrics to the corresponding management device,
    wherein the management device calculates the required blank time slots per second base station.

6. The interference handling method according to claim 4, further comprising transmitting by the second base stations or the management device a notification of the calculated required blank time slots per second base station to said first base station,
    wherein the first base station determines whether to change the blank time slots.

7. The interference handling method according to claim 4, wherein the management device determines whether to change the blank time slots and transmits a result of the determination to the first base station.

8. The interference handling method according to claim 4, wherein a cell covered by each of the second base stations is smaller than a cell covered by the first base station, and
    wherein at least a part of the cell covered by each of the second base stations overlaps with the cell covered by the first base station or the cell covered by each of the second base stations is included in the cell covered by the first base station.

9. The interference handling method according to claim 8, wherein the first base stain is a macro-cell base station and the second base stations are femto-cell base stations or pico-cell base stations.

10. The interference handling method according to claim 4, further comprising receiving by the first base station from the second base station a blank time slots change request signaled with a modify requested blank time slots pattern represented by a bit string and a number of bits set to "True".

11. In a radio communication system comprising a first base station configured to assign a portion of time division radio resources to blank time slots, a second base station configured to communicate with terminals using radio resources including the blank time slots, and a management device, the management device comprising:
    a receiver configured to receive information representing radio channel conditions or signal quality metrics reported from terminals communicating with the second base station;
    a required blank time slots calculation unit configured to calculate required blank time slots per second base station so that the number of required blank time slots will increase with an increase in the number of terminals located near a cell edge between the first base station and the second base station, according to an indicator for evaluating an amount of interference experienced by the terminals based on the information representing radio channel conditions or signal quality metrics for each second base station;
    a determination unit configured to determine whether to change blank time slots provided by the first base station based on the respectively required blank time slots; and
    a transmission unit configured to transmit a result of the determination to the first base station, wherein
    the determination unit is configured to determine, based on a plurality of required blank time slots received within a given period of time, whether to change blank time slots provided by the first base station according to a majority decision between the number of requests to increase the required blank time slots more than the current blank time slots and the number of requests to decrease the required blank time slots less than the current blank time slots.

* * * * *